Nov. 4, 1958  R. JONNARD  2,858,728
MICROSCOPE INTERFERENTIAL REFRACTOMETER
Filed Oct. 28, 1954  3 Sheets-Sheet 1

INVENTOR.
RAYMOND JONNARD
BY Herman J. Gordon
ATTORNEY

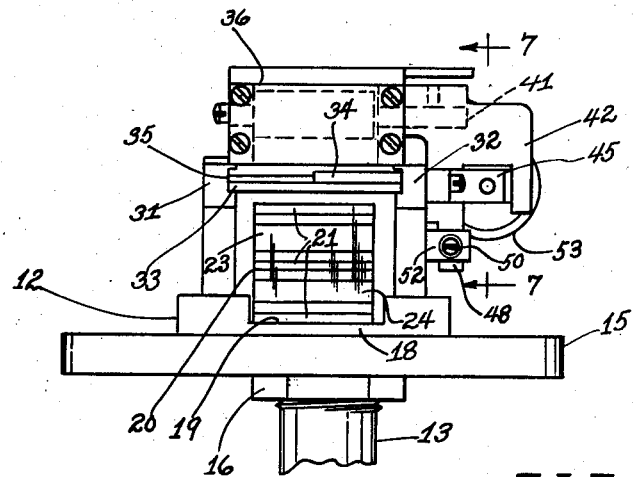
FIG. 4
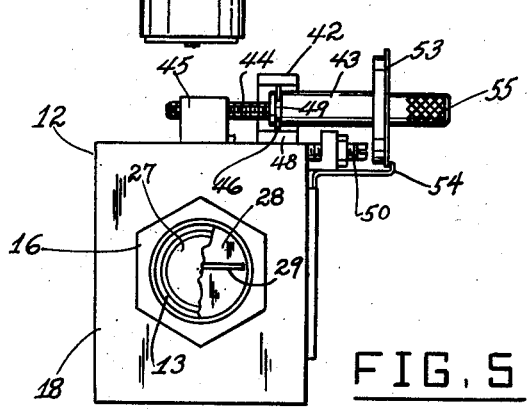
FIG. 5
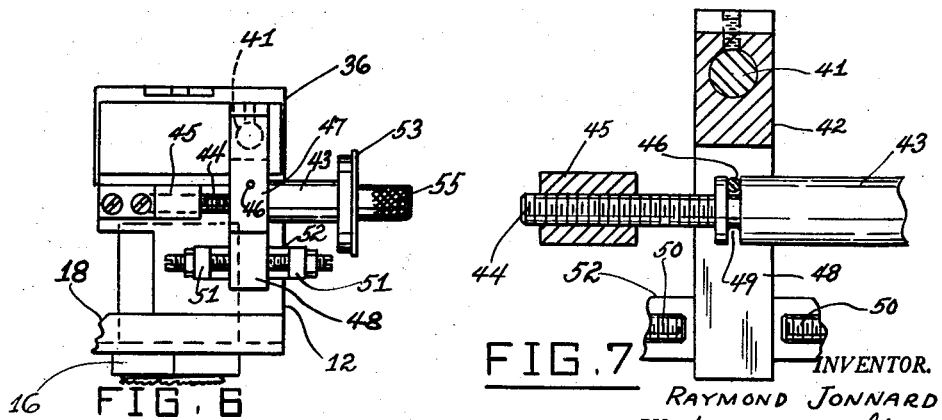
FIG. 6
FIG. 7
INVENTOR.
RAYMOND JONNARD
BY Herman L. Gordon
ATTORNEY United States Patent Office 2,858,728
Patented Nov. 4, 1958

2,858,728
MICROSCOPE INTERFERENTIAL
REFRACTOMETER

Raymond Jonnard, Bronx, N. Y.

Application October 28, 1954, Serial No. 465,362

6 Claims. (Cl. 88—14)

This invention relates to microscope accessories, and more particularly to an interferometric refractometer attachment for use with a microscope.

A main object of the invention is to provide a novel and improved refractometer device which is simple in construction, which is compact in size, and which may be employed in conjunction with a conventional microscope.

A further object of the invention is to provide an improved refractometer attachment for a microscope, said attachment involving relatively inexpensive components, being easy to mount on the stage of a conventional microscope, and providing an accurate means for measuring the refractive index of a liquid.

A still further object of the invention is to provide an improved interference refractometer device which may be employed for the measurement of relative refractive indices, refractive index differences, or relative variations in refractive indices, based on the phenomenon of light interference, the device being intended to be used in conjunction with a conventional microscope or similar magnifying compound device.

Further objects and advantages of the invention will become apparent from the following description and claims, and from the accompanying drawings, wherein:

Figure 4 is a fragmentary side elevational view of the refractometer attachment and microscope stage of Figures 2 and 3.

Figure 5 is a bottom view of the refractometer attachment of Figures 2 to 4 with the microscope stage omitted.

Figure 6 is a fragmentary side elevational view showing the details of the manually operable means for adjusting the angular position of the variable refractive index compensator plate employed in the refractometer attachment of Figures 2 to 5.

Figure 7 is an enlarged cross-sectional detail view taken on line 7—7 of Figure 4.

Figure 1:
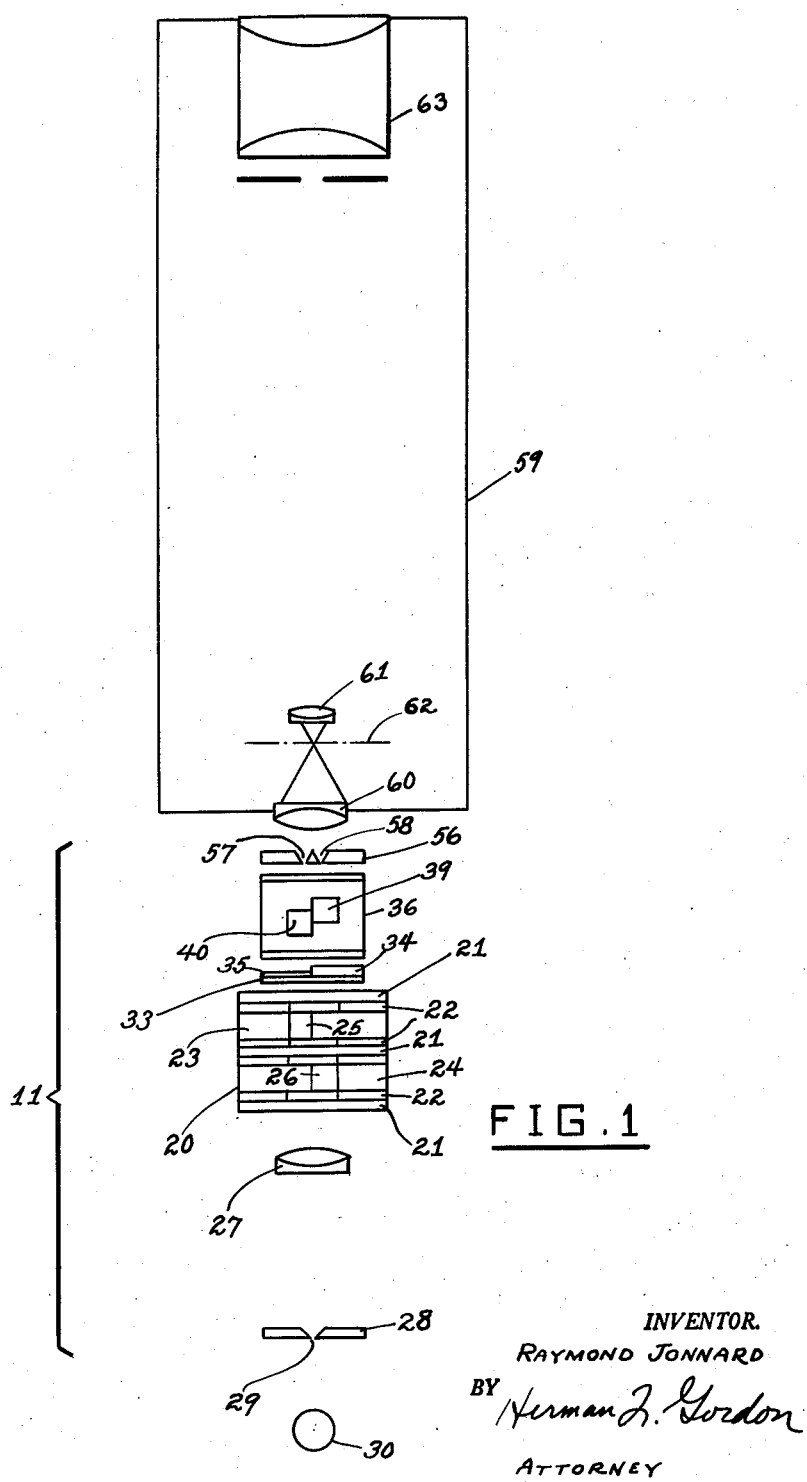
Figure 1 is a diagrammatic view illustrating the optical system of a refractometer defined by employing an improved attachment of the present invention in conjunction with a conventional microscope.

There exist numerous types and designs of instruments suitable for the measurement of refractive indices and of their variations and/or differences. Among these instruments, those allowing the use of differential measuring methods are particularly advantageous because of the possibility of either eliminating or reducing the sources of error, such as, unequal temperature distribution, differences in temperature coefficients, spectral dispersion differences, and the like, between compared refractive media. The most sensitive type of instruments permitting the use of differential methods of measurement are of the interferometric type.

In an instrument of the interferometric type, two beams of "parallel light" from a relatively small and distant source are, in effect, superimposed upon one another over some distance along their path within the instrument. Under proper conditions there exists in the region where the two beams have a common path a symmetrical distribution of light energy among a series of alternately clear and obscure zones (interference fringes) defining an "interference pattern." If the source is in the form of a slit externally illuminated, the zones referred to above are parallel to one another and to their linear source (the slit) and they are disposed symmetrically on both sides of the directly transmitted light trace. In order to obtain this phenomenon, means must be provided for separating two beams of light from the main ray emitted by the source, and the separated beams must have "coherence" and must be in phase with each other.

The width of the interference fringes (distance between two consecutive fringes of identical nature) depends only on the geometric dimensions of the instrument and on the wave length of the incident light.

Instruments of this type generally have a plane of symmetry which comprises the entrance slit or aperture. The interference pattern is arranged in another plane perpendicular to the plane or axis of symmetry.

In the case of an instrument having a plane of symmetry (having an entrance slit), if the two interfering beams have exactly equal optical paths, the center of symmetry of the fringe pattern coincides exactly with the geometric center of the instrument. Such coincidence is destroyed if the two paths are unequal. In this circumstance, the displacement of the center of the pattern from the geometric center of symmetry of the instrument depends exclusively upon the difference in length of these optical paths. Since the optical path of a light ray is defined as the product of the geometric length and the relative refractive index of the medium traversed by the light ray, by placing two media of the same thickness but different refractive indices in the path of each of the interfering rays, the displacement observed will be a measure of the refractive index difference of these two media.

In an instrument of the type comprising the present invention, light is received from a suitable entrance aperture or slit and passes through a system including two small apertures or slits close to and parallel to each other. A greater efficiency of utilization of the light passing the entrance aperture or slit is obtained if the two subsequent apertures or slits are placed behind a lens whose focus is coincident with the entrance aperture or slit. Among the advantages of this instrument is that the size thereof may be made relatively small, the position of the interference pattern is independent of the position of the external light source, the interference pattern may be observed at a close distance from the origin of the interfering beams of light, and the observation of the interference pattern may be made by means of a conventional microscope.

The present invention is based on the fact that in an interferometer in which the two "synchronous" beams of light are produced by diaphragming an achromatic lens, hereafter called the "collimator" lens with two small apertures or thin parallel twin slits, it is possible to place the collimator lens at such a distance from a small distant diaphragmed light source or a small unique aperture serving as the entrance aperture for the instrument that the light transmitted by the system will be practically "parallel" after emergence from it despite the diffraction produced by the twin apertures or slits employed. Thus, the light will remain "parallel" up to some distance from these slits, hereafter called the "working distance." In such a system, if another suitably corrected lens, hereafter called "objective I," is placed at any distance after the twin slits within the working distance, two real images of the single entrance aperture are produced and are exactly superimposed upon one another in the back focal plane of objective I. One may observe this focal plane with a suitable magnifier such as a single lens, a doublet, or a conventional microscope. Then one sees a magnified image of the entrance aperture in the plane of which are produced the fringes of interference, provided all the optical parts involved are of the proper quality and of the proper relative sizes. In such case, the spacing of the fringes as well as the actual location of the entire pattern relative to the position of the image of the entrance aperture are independent of the position of the light source employed to illuminate the instrument, and the pattern remains unchanged even when relatively diffused light is employed. In actual practice, it was found that the working distance defined above may be varied from only a few millimeters to several feet without affecting the aspect of the pattern produced. Furthermore, the sharpness of the image observed does not depend on the position of the objective I within this working distance. It can be demonstrated that the twin-apertured stop interposed between the collimator and the objective I reduces the total amount of light transmitted but does not affect the size, shape or position of the pattern produced.

It was further observed that the Abbe type of substage of the conventional microscope with its iris diaphragm and single corrected condenser lens, normally produces a bundle of parallel rays which, however, are not utilized in forming the final microscope image. These are the so-called "marginal rays" and they constitute an undesirable feature of the compound microscope optics. These rays occur either when the iris diaphragm is almost completely closed, or, when this diaphragm being partly open, a convergent mirror throws widely divergent or oblique rays into the microscope. If such rays come from a unique, wide, and sufficiently distant source they satisfy the condition of coherence sufficiently well to be usable for producing the phenomenon of interference, as explained above. Thus, a properly adjusted microscope substage may be made to perform the functions of an interferometer collimator, or system of a collimator lens with its conjugated entrance aperture. When so adjusted, the microscope substage system has no "back-focal intercept," but its numerical aperture is still given by the well known Abbe formula. In the usual compound microscope, all the marginal rays emerge parallel at the Ramsden circle. They do not contribute to the formation of the final image; but they do contribute to the total amount of light transmitted and therefore they produce a certain blurring of this image. If a twin-slit plate is placed behind the Ramsden circle, a typical, if weak and blurred interference pattern may be observed at some distance thereafter, thus demonstrating the property of coherence of the marginal rays transmitted by the microscope under these conditions.

In actual practice, an interferometer, being a measuring instrument, must include some means for interposing various fluids having definite thicknesses in alignment with the paths of the coherent beams of light, for example, a cell holder. Furthermore, the instrument must include some physical means of observing and of quantitatively estimating the fringe displacements produced when the optical paths differ from one another, as explained above. This last-named means involves the use of a "compensator."

It is accordingly a prime purpose of the present invention to provide a simplified type of interferometer including means for producing two synchronous beams of coherent light, a cell holder, and a compensator, adapted to be used in conjunction with a conventional commercial compound microscope, and which will enable the user thereof to perform rapid complete determinations of the relative refractive indices of fluids.

The scope of the invention is such that it may be embodied in any one of a number of different forms. In one form of instrument constructed according to the present invention, an optical system was built in the following way: a small plate carrying two narrow parallel slits was mounted in the center well of a microscope stage in a manner so that it could be centered relative to the substage condenser. A cell holder of suitable design was installed directly on the rectangular carriage of the microscope stage. A compensator of the Jamin type, oriented parallel to the twin slits was mounted rigidly onto the stage, together with a single achromatic lens having a power of between 2x and 10x, the assembly being in vertical alignment with the microscope tube, the distance between the slit plate and the regular microscope objective, hereafter called "objective II," being of the order of the distance between the stage and the objective II front lens when the microscope tube is at its upper limit of movement. Thus the microscope tube can be exactly focussed upon the back-focal plane of objective I. Under these conditions, the fringes became immediately visible when the substage iris diaphragm was reduced to an aperture of about 0.2 mm. in diameter and the light from a suitable distant source was projected into the instrument by means of the regular convergent mirror of the microscope, although even a plane mirror gave quite satisfactory results from the standpoint of the coherence of the fringes.

In another form of the invention, the Abbe condenser lens of the microscope substage system was replaced by two Billet half-lenses of the well known type, and no twin-slit plate was employed. The instrument included in addition a cell holder, a compensator, and another lens performing the functions of objective I substantially as described in the first example above, with the exception that the objective I was focussed exactly upon the plane where the Billet half-lenses formed the image of the closed iris diaphragm. The fringes became visible upon focussing the microscope tube on the back-focal plane of objective I. The same phenomenon was observed when, instead of closing the iris diaphragm, one utilized the light from an intense small light source placed at a great distance from the microscope, or even sunlight.

It will be understood that the path of the light rays produced by an instrument embodying the features of the present invention may be deviated in any way by any type of additional optical or mechanical device which will not destroy the coherence of the light beams, which may be placed within the space defined by the working distance, for the purpose of increasing or changing this working distance, or for any other purpose, without departing from the spirit of the present invention.

In another form of the invention, the cell holder, a twin-aperture plate, the compensator, and objective I were all rigidly assembled with the collimator lens and the entrance diaphragm in permanent alignment with one another on a metal frame arranged to be clamped directly on the rectangular stage of a commercial compound microscope.

In still another form of the invention, the parts listed above were assembled rigidly relative to each other, substantially as described in the first preceding paragraph above, but in addition, the microscope diaphragm was replaced by a narrow slit parallel to the twin-slit plate. Thus, the ensemble of the entrance slit and condenser performed all the functions of both the interferometer collimator and of the microscope substage condenser. This latter arrangement, while being fundamentally similar to that described in the preceding example, was found to offer several desirable features in actual practice, particularly since the resulting instrument can be permanently aligned at the factory and becomes immediately functional when installed on the stage of a microscope of any well known commercial type.

It will be understood that all instruments constructed in accordance with the present invention may be utilized with filtered and/or monochromatic light produced by external physical means or devices not specifically described herein, as well as white light, without departing from the spirit of this invention.

In actual practice, certain definite relationships must be observed regarding the dimensions of the entrance aperture, the width and spacing of the stops of the stop plate, or spacing of the other devices proposed to replace this stop plate, and the focal distance of the collimator lens. These relationships are given in the well known general theory of interference. In particular, considerable discretion exists regarding the relative position of the cell holder and stop plate along the light paths, once the position of the collimator lens and objective I have been defined. For instance, in a further form of the invention, the stop plate was placed between the compensator and objective I, instead of being inserted immediately after the collimator lens.

In a still further form of the invention, in conformity with the preceding paragraph, the compensator was placed immediately after the collimator lens, between this lens and the cell holder, instead of being placed between the cell holder and objective I. In still another form, the instrument included in sequence: the entrance aperture, collimator lens, cell holder, compensator, the first lens of objective I, the stop plate, and the second lens of objective I, the latter being followed by the regular microscope tube and its conventional optics.

Obviously, other possible arrangements exist, and will be included within the scope of the present invention.

Figure 3:
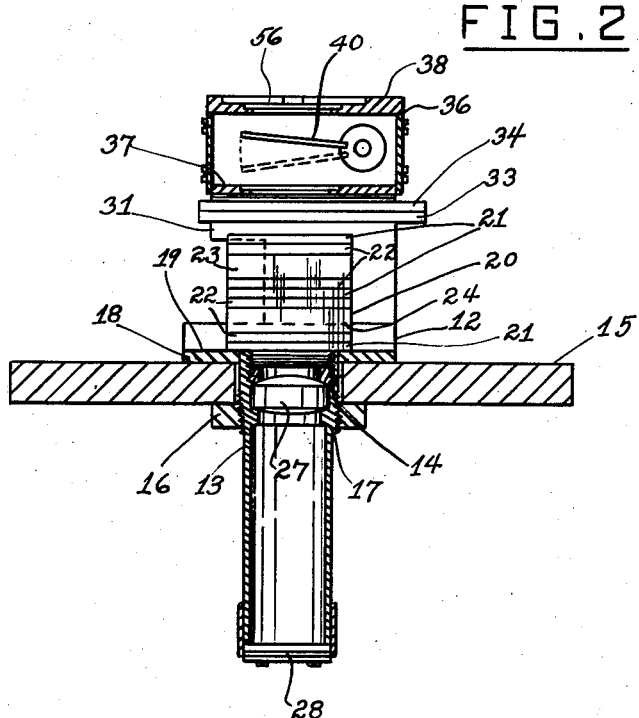
Figure 3 is a vertical cross-sectional view taken on line 3—3 of Figure 2.

Referring to the drawings, wherein a typical embodiment of the present invention is illustrated, the interferometric refractometer attachment is designated generally at 11 and comprises a main bracket or frame member 12 provided with a depending tubular element 13 adapted to be inserted through the central opening 14 of a conventional microscope stage 15. A fastening nut 16 is engageable on an externally threaded upper portion 17 of the tubular element 13 and may be tightened against the bottom surface of the stage 15 for clampingly securing the main bracket 12 to the stage, as shown in Figures 3 and 4.

The base portion 18 of the bracket member 12 is formed with a channel or seat 19 adapted to receive a cell 20 which comprises a plurality of superimposed transparent plates of glass or the like, which are suitably held together, as by the use of suitable grease at their adjacent surfaces, so that said plates may be separated from each other when desired. Said plates comprise relatively thin imperforate top, bottom and intermediate plates 21, centrally apertured plates 22, and respective thicker plates 23 and 24 having semi-circular apertures 25 and 26, arranged as shown in Figure 1, the semi-circular apertures 25 and 26 being disposed on opposite sides of a common vertical diametral plane and defining respective receptacles for a reference liquid and the liquid under study on the opposite sides of said diametral plane. Said diametral plane contains the optical axis of the system and is the plane of symmetry thereof, as will presently become apparent. As shown in Figure 1, the intermediate glass plate 21 seals the receptacle 25 from the receptacle 26, and the top and bottom plates 21 form the top and bottom closures for the cell.

Secured in the upper portion of the tubular member 13 is a collimating lens 27 which is spaced its focal length from a slit plate 28 secured to the bottom end of the tubular member, said plate being formed with the diametral slit 29 adapted to receive light from a suitable source 30 disposed below the microscope stage 15, whereby the rays of light passing through the slit 29 will be collimated by the lens 27, and will pass upwardly through the cell 20.

The upper portion of bracket member 12 comprises the opposing, parallel channelled horizontal arms 31 and 32 spaced on opposite sides of the seat 19. Supported in said arms 31 and 32 is a first transparent plate member 33 of uniform thickness and supported over the top of cell 20, as shown in Figure 4. Cemented on the portion of plate 33 overlying the reference liquid chamber 26 of cell 20 is a transparent fixed compensator plate 34. A second transparent compensator plate 35 is removably disposed on the portion of plate 33 overlying the chamber 25 of cell 20. Plate 35 is of calibrated thickness and is selected in accordance with the range of index of refraction to be covered in connection with the liquid to be studied, said liquid being contained in the chamber 25.

Secured on the arms 31 and 32 over the plates 34 and 35 is a housing 36 having a centrally apertured bottom wall 37 and a centrally apertured top wall 38, the apertures of the walls being aligned with the axis of tubular member 13 and overlying the cell 20. Fixedly secured in housing 36 over the fixed compensator plate 34 and chamber 26 is a first, relatively thin transparent plate 39. A similar second thin transparent plate 40 is secured to a horizontal shaft member 41 journalled in housing 36, said plate 40 overlying the compensator plate 35 and the chamber 25. Shaft member 41 extends outside the housing 36 and is secured to a depending yoke member 42. Extending between the arms of yoke member 42 is a horizontal shaft member 43 having a reduced screw portion 44 threadedly engaged through a lug 45 secured to arm 32 of main bracket 12. A transverse pin 46 is secured between the arms 47 and 48 of yoke member 42 and engages in an annular groove 49 in shaft member 43, whereby yoke member 42 and shaft 41 may be rotated by advancing or retracting shaft member 43 with respect to lug 45. Respective opposing adjustable stop screws 50, 50 are mounted in the respective arms 51, 51 of a U-shaped bracket 52 secured to main bracket 12, said stop screws being located adjacent opposite edges of the yoke arm 48, as shown in Figure 7, to limit rotation of yoke member 42.

Figure 2:
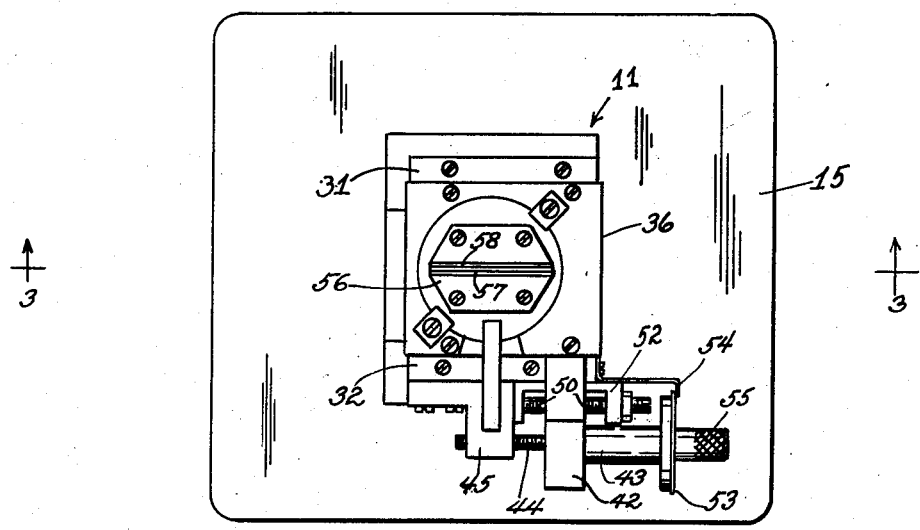
Figure 2 is a top plan view of a refractometer attachment according to the present invention, shown mounted on a microscope stage.

A calibrated disc member 53 is carried on the shaft member 43 and a stationary index pointer 54 is secured to main bracket 12, said pointer overlying the scale on the disc member 53, as shown in Figures 2 and 5. Shaft member 43 is provided with the knurled end portion 55 for manually rotating said shaft member.

Rotation of the transparent inclined plate 40 varies the effective thickness thereof through which light collimated parallel to the axis of member 13 must pass, in accordance with the inclination of said plate to the horizontal.

By adjusting the angle of inclination of plate 40, the effective thickness thereof in the optical path of the collimated light, together with the difference in thickness between compensator plates 34 and 35, may be adjusted to compensate for the difference between the indices of refraction of the liquids in chambers 25 and 26. The liquid to be studied is contained in chamber 25 and the reference liquid is contained in chamber 26. By properly calibrating the disc 53, the index of refraction of the liquid in chamber 25 may be found directly from disc 53 in a manner presently to be described.

Mounted in the top wall 38 of housing 36 over the aperture thereof is a double slit plate 56 having the parallel, closely spaced slits 57, 58 parallel to slit 29 and spaced symmetrically on opposite sides of the vertical plane of slit 29 (the plane of symmetry of the system), as shown in Figure 1. Thus slit 57 is in the path of the collimated light passing through the angularly adjustable plate 40 and slit 58 is in the path of the collimated light passing through the fixed plate 39.

In a specific embodiment of the invention, such as that illustrated in the drawings, the slit 29 in the plate 28 was 0.05 mm. wide and 15 mm. long. The slits 57 and 58 in the plate 56 were 0.046 mm. wide, spaced apart by 1.55 mm., and the focal length of the collimator lens was 49 mm.

In the typical diagrammatic arrangement of the elements shown in Figure 1, 59 designates the draw-tube of a conventional microscope, on the stage of which the interferometric refractometer attachment 11 is mounted in the manner above described. The objective lens 60 of the microscope is employed as a decollimator, in accordance with the previous discussion above, and a real image is formed between the objective lens 60 and the second microscope lens, shown at 61, for example, on a plane 62 perpendicular to the plane of symmetry of the instrument. This image comprises the interference pattern described above.

The microscope is preferably of the type provided with a standard reticule 63 having the usual cross-hairs.

The procedure followed in a typical mode of use of the instrument, using white light, is as follows:

(1) Chambers 25 and 26 are first filled with a suitable solvent liquid of known index of refraction, to be employed as a reference medium.

(2) A central white fringe and colored side fringes will be observed through the eye piece of the microscope.

(3) The variable compensator plate 40 is then rotated by means of knurled member 55 until the white fringe is centered on the cross-hair.

(4) The liquid is then removed from chamber 25 or chamber 26 and is replaced with the liquid of unknown index of refraction.

(5) Variable compensator plate 40 is again rotated until the white fringe is again centered.

(6) The difference in the angular position of the compensator plate 40 from its setting in step 2, as read from disc 53 will give a value proportional to the difference in refractive index between the reference liquid and the unknown liquid, allowing the refractive index of the unknown liquid to be readily determined.

While certain specific embodiments of an improved interferometric instrument for measuring refractive indices have been disclosed in the foregoing description, it will be understood that various modifications within the spirit of the invention may occur to those skilled in the art. Therefore it is intended that no limitations be placed on the invention except as defined by the scope of the appended claims.

What is claimed is:

1. A refractometer attachment for use with a microscope of the type having a decollimating objective and a stage provided with a central opening located beneath said objective, said attachment comprising a support, a depending tube secured to said support and adapted to extend through said opening, fastening means removably secured on the tube and being cooperable with the stage to clamp the support and tube thereto with the tube extending through the opening, a diaphragm plate at the lower end of said tube, said plate being formed with a diametral slit, a collimating lens in said tube focussed on said slit, means to illuminate said slit, whereby parallel rays emerge from said lens having a plane of symmetry containing said slit, bracket means on the support formed and arranged to hold a transparent medium in the path of the rays on one side of said plane, an angularly movable transparent compensator plate mounted on said support in the path of the parallel rays on said one side of said plane, and a double slit member mounted on said support in the path of the rays with the slits thereof parallel to and spaced on opposite sides of said plane, said last-named slits being spaced to superimpose the rays passing therethrough in the microscope objective, whereby to produce interference fringes.

2. The structure of claim 1, and wherein said bracket means comprises a body formed with a channel adapted to receive a cell containing the transparent medium.

3. The structure of claim 1, and wherein said bracket means includes opposing arms and a housing secured on the arms, said compensator plate being located in said housing.

4. The structure of claim 1, and wherein said bracket means comprises a body formed with a channel adapted to receive a cell containing the transparent medium and a housing spaced above said channel and containing said compensator plate.

5. A refractometer attachment for use with a microscope of the type having a decollimating objective and a stage provided with a central opening located beneath said objective, said attachment comprising a support, a depending tube secured to said support and adapted to extend through said opening, a nut threadedly engaged on the tube and being cooperable with the bottom surface of the stage to clamp the support and tube thereto with the tube extending through the opening, a diaphragm plate at the lower end of said tube, said plate being formed with a diametral slit, a collimating lens in said tube focussed on said slit, means to illuminate said slit, whereby parallel rays emerge from said lens having a plane of symmetry containing said slit, bracket means on the support formed and arranged to hold a transparent medium in the path of the rays on one side of said plane, an angularly movable transparent compensator plate mounted on said support in the path of the parallel rays on said one side of said plane, and a double slit member mounted on said support in the path of the rays with the slits thereof parallel to and spaced on opposite sides of said plane, said last-named slits being spaced to superimpose the rays passing therethrough in the microscope objective, whereby to produce interference fringes.

6. The structure of claim 1, and a further transparent compensator plate removably mounted on said support in the path of the parallel rays on said one side of said plane perpendicular to said plane.

References Cited in the file of this patent

UNITED STATES PATENTS

| 1,868,908 | Lindley | July 26, 1932 |
| 2,668,471 | Benzinger et al. | Feb. 9, 1954 |

FOREIGN PATENTS

| 295,132 | Switzerland | Feb. 16, 1954 |

OTHER REFERENCES

Jenkins and White text, "Fundamentals of Optics," 1950, pages 251 and 252, published by McGraw-Hill Book Co., Inc.